US012305843B2

(12) United States Patent
Liang et al.

(10) Patent No.: US 12,305,843 B2
(45) Date of Patent: May 20, 2025

(54) LIGHTING DEVICE HAVING A LENS PLATE

(71) Applicant: SIGNIFY HOLDING B.V., Eindhoven (NL)

(72) Inventors: Chuan Liang, Jiang Su (CN); Sun Jinping, Shanghai (CN); Yifan Hao, Shanghai (CN)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 18/684,224

(22) PCT Filed: Aug. 12, 2022

(86) PCT No.: PCT/EP2022/072688
§ 371 (c)(1),
(2) Date: Feb. 16, 2024

(87) PCT Pub. No.: WO2023/020969
PCT Pub. Date: Feb. 23, 2023

(65) Prior Publication Data

US 2024/0255134 A1 Aug. 1, 2024

(30) Foreign Application Priority Data

Aug. 19, 2021 (WO) ................ PCT/CN2021/113444
Sep. 24, 2021 (EP) .................................... 21198855

(51) Int. Cl.
*F21V 23/00* (2015.01)
*F21V 5/00* (2018.01)
*F21V 23/06* (2006.01)
*F21Y 105/16* (2016.01)
*F21Y 115/10* (2016.01)

(52) U.S. Cl.
CPC .............. *F21V 23/06* (2013.01); *F21V 5/007* (2013.01); *F21V 23/005* (2013.01); *F21Y 2105/16* (2016.08); *F21Y 2115/10* (2016.08)

(58) Field of Classification Search
CPC ............. F21Y 2103/10; F21Y 2105/10; F21Y 105/16; F21Y 115/10; H05B 45/46; H05B 47/155; F21V 23/06
See application file for complete search history.

(56) References Cited

U.S. PATENT DOCUMENTS 5,463,280 A * 10/1995 Johnson .................. F21K 9/232 362/800
7,609,006 B2 * 10/2009 Gibboney .............. H05B 45/00 315/185 S
7,852,011 B2 * 12/2010 Peng ...................... H05B 45/00 315/185 S
8,704,241 B2 * 4/2014 Yeh ........................ H10H 29/10 257/82
(Continued)

FOREIGN PATENT DOCUMENTS

CN 106287363 A 1/2017
CN 110139437 A 8/2019
(Continued)

*Primary Examiner* — William J Carter

(57) ABSTRACT

A lighting device has a LED panel and a lens plate mounted over the LED panel. The lens plate includes a configurable set of connectors which are able to configure the LED panel into a selected one of first and second circuit configurations.

13 Claims, 9 Drawing Sheets

(56) References Cited

U.S. PATENT DOCUMENTS

| | | | | |
|---|---|---|---|---|
| 2005/0110426 | A1* | 5/2005 | Shao | F21S 4/10<br>315/185 S |
| 2018/0017247 | A1 | 1/2018 | Van Asselt et al. | |
| 2018/0017248 | A1* | 1/2018 | Athauda | F21V 23/06 |

FOREIGN PATENT DOCUMENTS

| | | | |
|---|---|---|---|
| CN | 211780590 | U | 10/2020 |
| JP | 2015065181 | A | 4/2015 |
| WO | 2017054091 | A1 | 4/2017 |

* cited by examiner

LIGHTING DEVICE HAVING A LENS PLATE

CROSS-REFERENCE TO PRIOR APPLICATIONS

This application is the U.S. National Phase application under 35 U.S.C. § 371 of International Application No. PCT/EP2022/072688, filed on Aug. 12, 2022, which claims the benefit of European Patent Application No. 21198855.5, filed on Sep. 24, 2021, and International Application No. PCT/CN2021/113444, filed on Aug. 19, 2021. These applications are hereby incorporated by reference herein.

FIELD OF THE INVENTION

This invention relates to lighting devices which combine a LED panel and a lens plate over the LED panel, for providing beam shaping or directing of the light output from the LED panel.

BACKGROUND OF THE INVENTION

LED circuits typically comprise a large number of LEDs, in order to obtain the desired light output flux.

There are different ways to connect electrically the LEDs. Connecting a set of LEDs in series will require a large drive voltage, sufficient to exceed the sum of the threshold voltages of all of the LEDs in series, but a low current is needed since the same current flows through all of the LEDs. Connecting the set of LEDs as multiple parallel branches reduces the voltage but increases the drive current needed, and this is electrically less efficient. Having multiple branches of LEDs however allows individual branches to be turned on or off (or driven with a duty cycle). For example, different branches may comprise different color LEDs so that color control can be achieved.

Different customers may have different requirements for the way the LED circuit is configured. By way of example only, different customers may require use of a different drive voltage to the LED modules. For example, some customers may choose to use a Class 2 power supply or a Safety Extra Low Voltage (SELV) power supply in their lamps, in which case they need a circuit configuration suitable for low voltage operation, such as with module voltages of 36V or 48V. In order to achieve higher efficiency, some customers may choose to use high voltage and low current power supplies, and hence require a circuit configuration suitable for high voltage operation, for example with module voltages such as 100V or 200V or even higher.

It is known to be able to configure a LED circuit in different configurations (e.g. parallel or series) using electrical jumpers which are for example soldered to implement the desired circuit configuration. The known use of jumpers to alter the circuit configuration however complicates the manufacture and/or assembly of the system.

There is therefore a need for a more simple way to provide the circuit configurability.

JP 2015065181A discloses an LED lighting device capable of changing lightness and color temperature with a spring comes into contact with and out of contact with different conduction patterns.

CN 106287363A discloses a brightness-adjustable illuminating device comprises a lamp shade rotatably arranged on a fixed base and covers the light-emitting elements, and a jumper connected to the lamp shade. The jumper can rotate between multiple jumping points relative to the fixed base, and the jumping positions correspond to different connection states of the resistors and different brightness degrees of the light-emitting elements.

WO 2017054091A1 discloses a light emitting diode assembly for using in street light fixtures. The light emitting diode assembly can be mounted in a street light fixture without the use of screws and is clipped into the body of the street light fixture.

SUMMARY OF THE INVENTION

The invention is defined by the claims.

According to examples in accordance with an aspect of the invention, there is provided a lighting device comprising:

- a LED panel, comprising:
  - a LED carrier;
  - an arrangement of LEDs on the LED carrier; and
  - connector pads on the LED carrier, wherein a first set of interconnections between the connector pads configures the arrangement of LEDs into a first circuit configuration and a second set of interconnections between the connector pads configures the arrangement of LEDs into a second, different, circuit configuration; and
- a lens plate mounted over the LED panel, wherein the lens plate comprises:
  - a first, light exit, face, and an opposite second face;
  - an array of lenses;
  - a configurable set of connectors extending from the second face, wherein the set of connectors is for contacting the connector pads of the LED panel, thereby to configure the LED panel into a selected one of the first circuit configuration and the second circuit configuration; wherein the first circuit configuration comprises more LEDs in a series than the second circuit configuration.

The lens plate of this lighting device can be used to set the circuit configuration of the LED panel over which the lens plate is mounted, for example to choose between a high voltage mode and a low voltage mode. In this way, a single LED panel design is able to be used in (at least) two different circuit configurations. This reduces inventory and thereby reduces cost as well as providing flexibility for the customer. The configuration of the LED panel can simply be achieved by connectors of the lens plate.

The first circuit configuration is for example a relatively high voltage (or being called as a first voltage) circuit configuration and the second circuit configuration is a relatively low voltage (or being called as a second voltage) circuit configuration.

Thus, the LED panel has two possible operating modes, with different drive voltages. The high voltage circuit configuration is suitable for a high voltage and low current power supply, for high efficiency, such as with module voltages of 100V or 200V or even higher. The low voltage circuit configuration is for example for a Class 2 power supply or Safety Extra Low Voltage (SELV) power supply, such as with a module voltage of 36V or 48V.

The circuit configurations may instead relate to other circuit differences, for example different circuit configurations for different color channels.

Each connector may comprise a folded metal sheet for connecting together two adjacent connector pads of the LED panel. The connectors are thus simple, low cost parts.

The folded metal sheets are for example each adapted to provide a spring contact force against the connector pads. This ensures good electrical contact to the connector pads.

The lens plate may comprise a set of mounting pins, each of which is for mounting a connector. Thus, by mounting a suitable set of connectors over the correct set of pins, the lens plate is able to set the configuration of the LED panel.

The configurable set of connectors may form a connector block. This makes the configuration simple to implement, by simply mounting a connector block in the chosen location, or mounting the chosen connector block (of a set) in its associated location.

The LED carrier for example comprises a printed circuit board and the connector pads comprise bare copper pads of the printed circuit board. Thus, the interconnections are simply made by surface contact.

The first circuit configuration for example comprises a series connection of all of the LEDs and the second circuit configuration comprises a connection of multiple parallel branches of LEDs. Thus, the first (high voltage) configuration has all LEDs in series and the second (low voltage) configuration has multiple parallel branches of LEDs.

The arrangement of LEDs may comprises branches of LEDs, wherein each branch has an open circuit connector pad at least at one end.

Only when the lens plate is present is the circuit completed (and the open circuit connector pads are then connected to other connector pads in the circuit to complete the circuit).

The arrangement of LEDs for example comprises:
- a positive terminal;
- a negative terminal;
- a first branch of series LEDs connected at one end to the positive terminal and connected to an open circuit connector pad at the other end;
- a second branch of series LEDs connected at one end to the negative terminal and connected to an open circuit connector pad at the other end;
- one or more additional branches of LEDs, each having an open circuit connector pad at both ends.

The branches are thus not connected together until the interconnections between the connector pads are made.

The connector pads are for example formed as a grid, and the configurable set of connectors is configurable to provide connections either in a first direction of the grid or in a second, orthogonal, direction of the grid.

When in the first circuit configuration, the LED panel for example has a LED drive voltage of over 100V and when in the second circuit configuration the LED panel has a LED drive voltage of below 100V for example in the range 24V to 48V.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
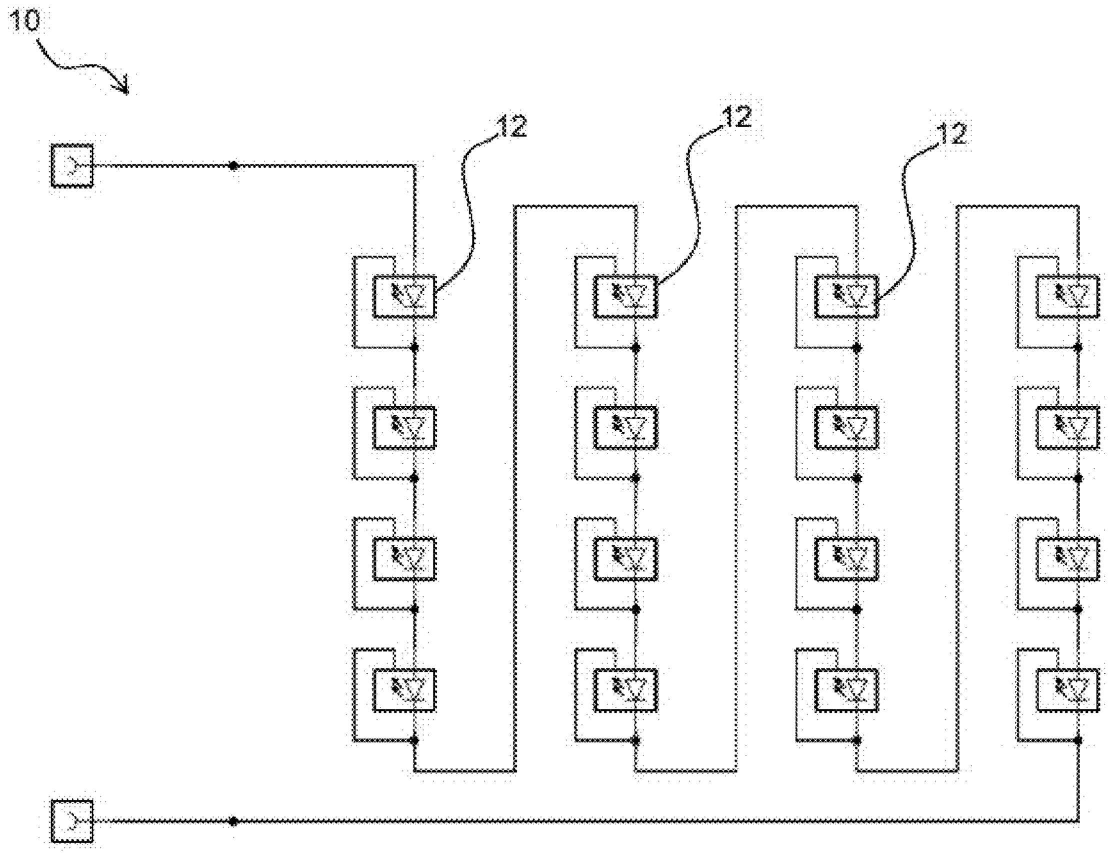
FIG. 1 Prior Art
FIG. 1 shows a LED circuit comprising a set of LEDs all in series.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a lighting device having a LED panel and a lens plate mounted over the LED panel. The lens plate includes a configurable set of connectors which are able to configure the LED panel into a selected one of first and second circuit configurations.

FIG. 1 shows a LED circuit 10 comprising a set of LEDs 12 all in series between positive and negative input terminals. However, rather than being formed as a single line, the LEDs 12 are shows as four branches physically in parallel but electrically connected in series.

Figure 2:
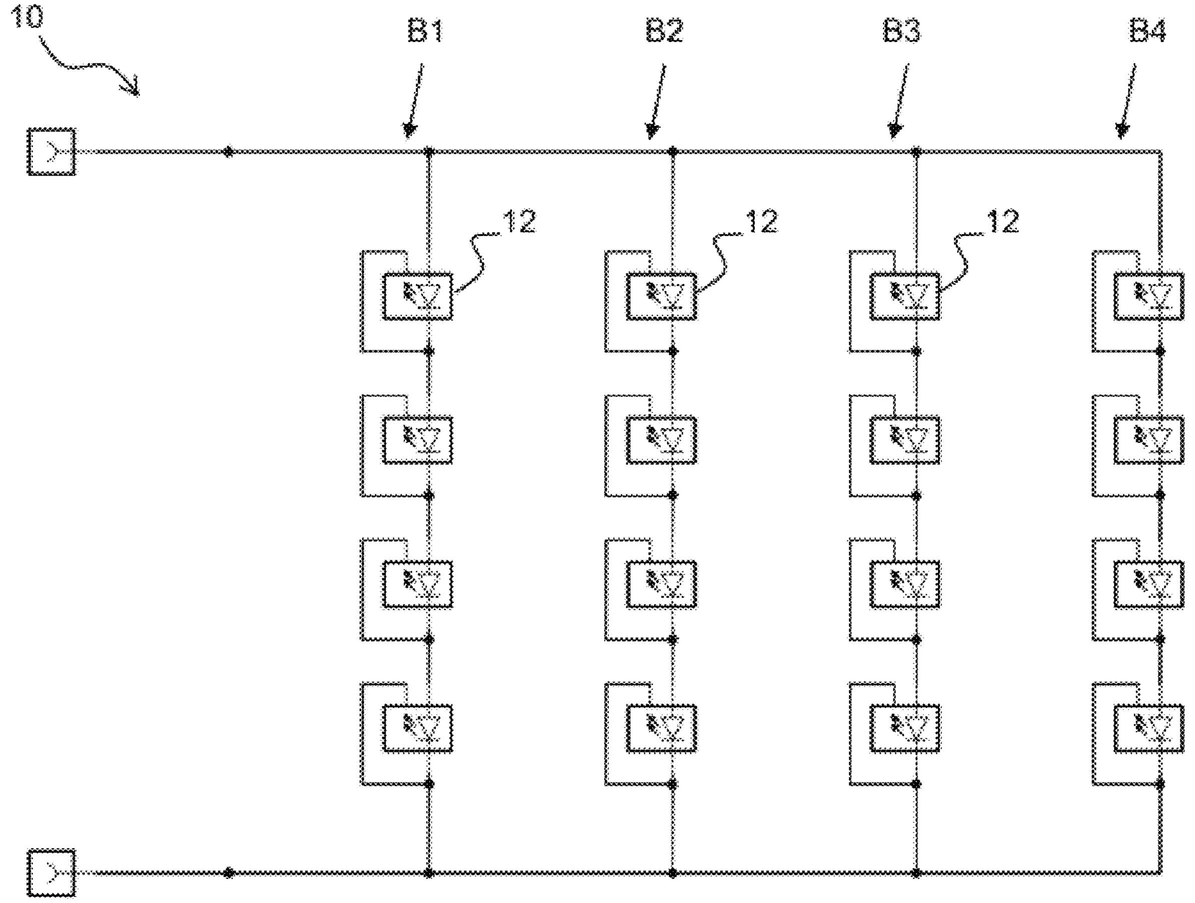
FIG. 2 Prior Art
FIG. 2 shows a LED circuit comprising a set of parallel branches, each branch comprises a set of LEDs in series.

FIG. 2 shows a LED circuit 10 comprising a set of parallel branches B1 to B4, each branch comprises a set of LEDs 12 in series. This circuit configuration is suitable for a low voltage driver. It shows the same 4×4 grid of LEDs as in FIG. 1 but with a different circuit configuration.

The invention makes use of a LED circuit which is configurable into different circuit configurations.

Figure 3:
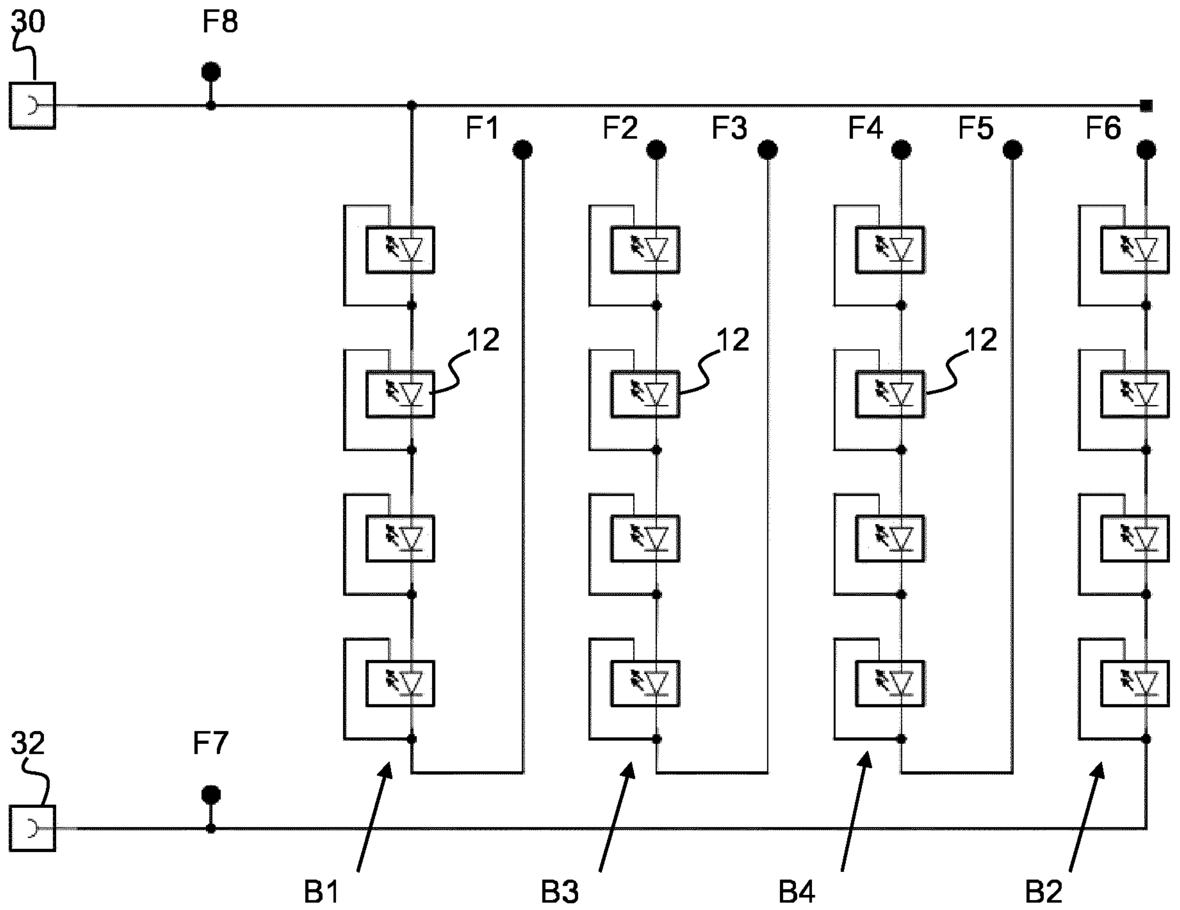
FIG. 3 shows an example of LED panel which may be used in the lighting device of the invention.

FIG. 3 shows an example of LED panel circuit which may be used in the lighting device of the invention so that the LED panel may be configured in either the high voltage arrangement of FIG. 1 or the low voltage arrangement of FIG. 2.

The LED panel comprises a circuit having a positive terminal 30 and a negative terminal 32. A first branch B1 of series LEDs 12 is connected at one end to the positive terminal 30 and connected to an open circuit connector pad F1 at the other end.

A second branch B2 of series LEDs is connected at one end to the negative terminal 32 and connected to an open circuit connector pad F6 at the other end.

The input terminals are also coupled to connector pads F7, F8.

In this example there are two additional branches B3, B4 of LEDs, each having an open circuit connector pad at both ends. Brach B2 has connector pads F2 and F3, and branch B4 has connector pads F4 and F5.

The positive terminal 30 is connected to pad F8 and the negative terminal 32 is connected to pad F7.

The branches B1 to B4 are thus not connected together until interconnections between the connector pads are made.

The LED panel comprise a printed circuit board on which the LEDs are mounted and the connector pads F1 to F8 comprise bare copper pads of the printed circuit board. Thus, interconnections between the pads can be made by surface contact.

Figure 4:
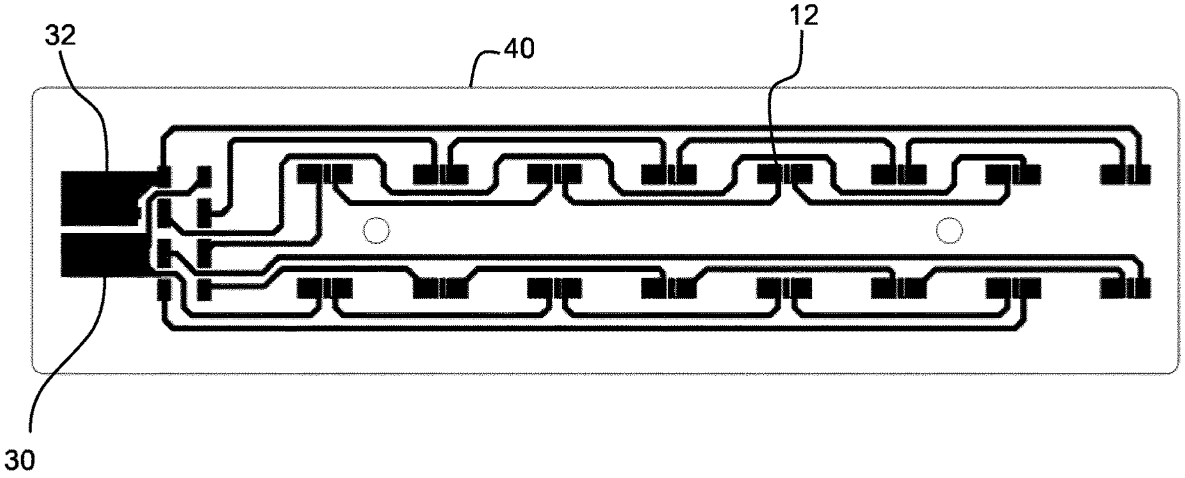
FIG. 4 shows an example of the track layout of the PCB between the LEDs to create the circuit of FIG. 3.

FIG. 4 shows an example of the track layout of the PCB 40 between the LEDs 12 to create the circuit of FIG. 3, but grouping the connector pads F1 to F8 together at one circuit region (at the left)

Figure 5:
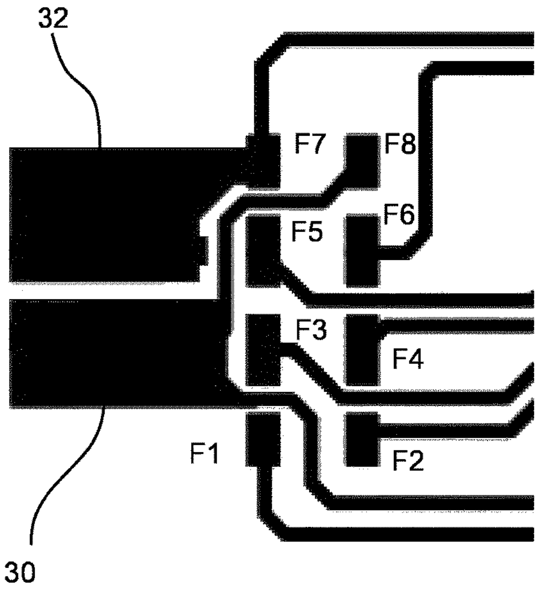
FIG. 5 shows an enlarged view of the connector pad area of FIG. 4.

FIG. 5 shows an enlarged view of the connector pad area and shows the pads F1 to F8 corresponding to the pads shown in the circuit diagram of FIG. 3.

A first set of interconnections between the connector pads configures the arrangement of LEDs into the first circuit configuration (of FIG. 1 in this example) and a second set of interconnections between the connector pads configures the arrangement of LEDs into a second, different, circuit configuration (of FIG. 2 in this example).

As can be seen from FIG. 3, a series configuration can be made with connections F1-F2, F3-F4 and F5-F6. Thus, three connectors are needed. The parallel configuration can be made with connections F1-F3, F3-F5, F5-F7, F2-F4, F4-F6 and F6-F8. Thus, six connections are needed.

The invention makes use of the lens plate mounted over the LED panel to make these connections.

Figure 6:
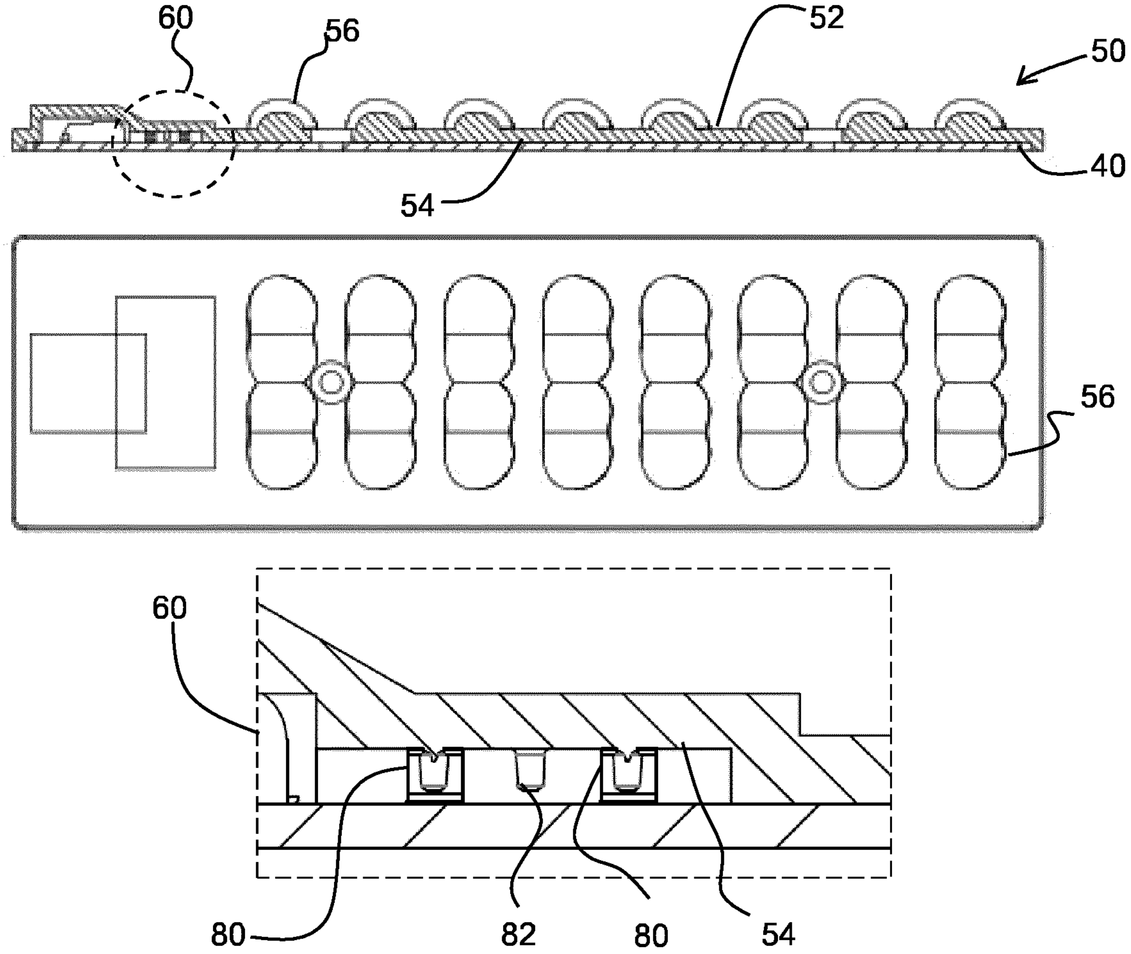
FIG. 6 shows the complete lighting device comprising the PCB and a lens plate over the top.

FIG. 6 shows the complete lighting device comprising the PCB 40 and a lens plate 50 over the top. FIG. 6 shows a cross section in the top image, a plan view in the middle image and an enlarged view of part of the cross section in the bottom image.

The lens plate comprises a first, light exit, face 52 and an opposite second face 54. An array of lenses 56 is provided, in this example comprising so-called peanut lenses provided over the light exit face 52. One lens may be provided over each LED, but there may equally be groups of LEDs beneath individual lenses. Other lens designs may of course be used, and the curved lens surface may be on the outer facing surface, or the opposite back surface, or both.

The lens plate includes a configurable set of connectors extending from the second face 54 (i.e. back towards the PCB 40) at the location 60 of the connector pads (i.e. the PCB area shown in FIG. 5).

The bottom image of FIG. 6 shows an enlarged view of the location 60. It shows connectors 80 extending down from the second face 54 to make contact with contact pads on the upper surface of the PCB 40. The connectors 80 are each mounted on a respective pin 82. There are more pins than connectors because different pins are used in the different configurations.

Figure 7:
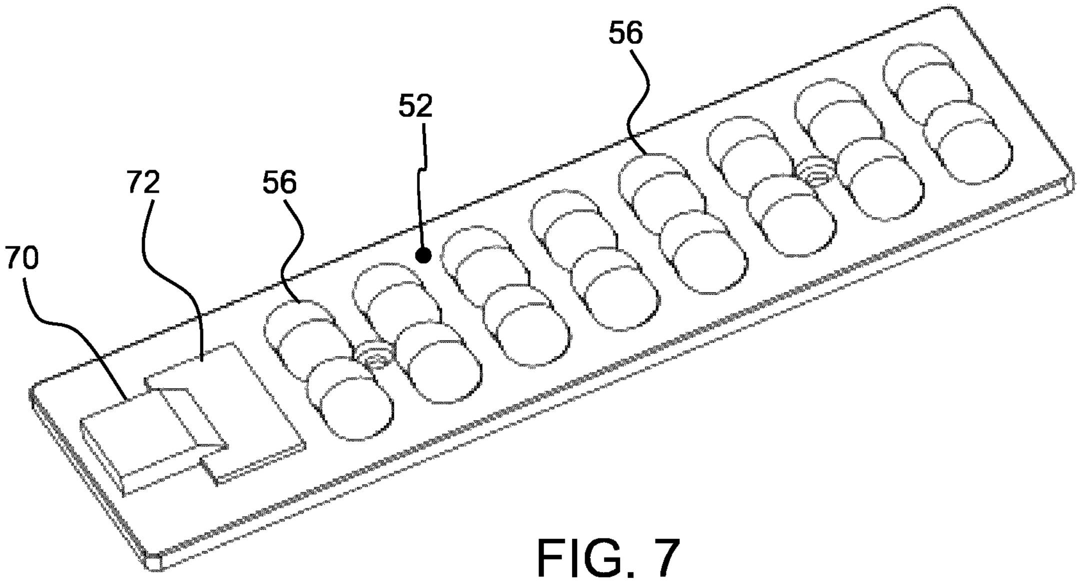
FIG. 7 shows the lighting device in perspective view.

FIG. 7 shows the lighting device in perspective view. A terminal housing 70 receives a connector which connects to the positive and negative terminals, for connecting the lighting device to a driver.

A mounting area 72 provides a support for the connectors in the location 60. The pins 82 extend down from the underside of this mounting area as can be seen in FIG. 6.

The terminal housing 70 and the mounting area 72 are integral portions of the lens plate 50 as shown in the figures, alternatively, one or both of them can be a separate part which is assembled on the lens plate 50.

Figure 8:
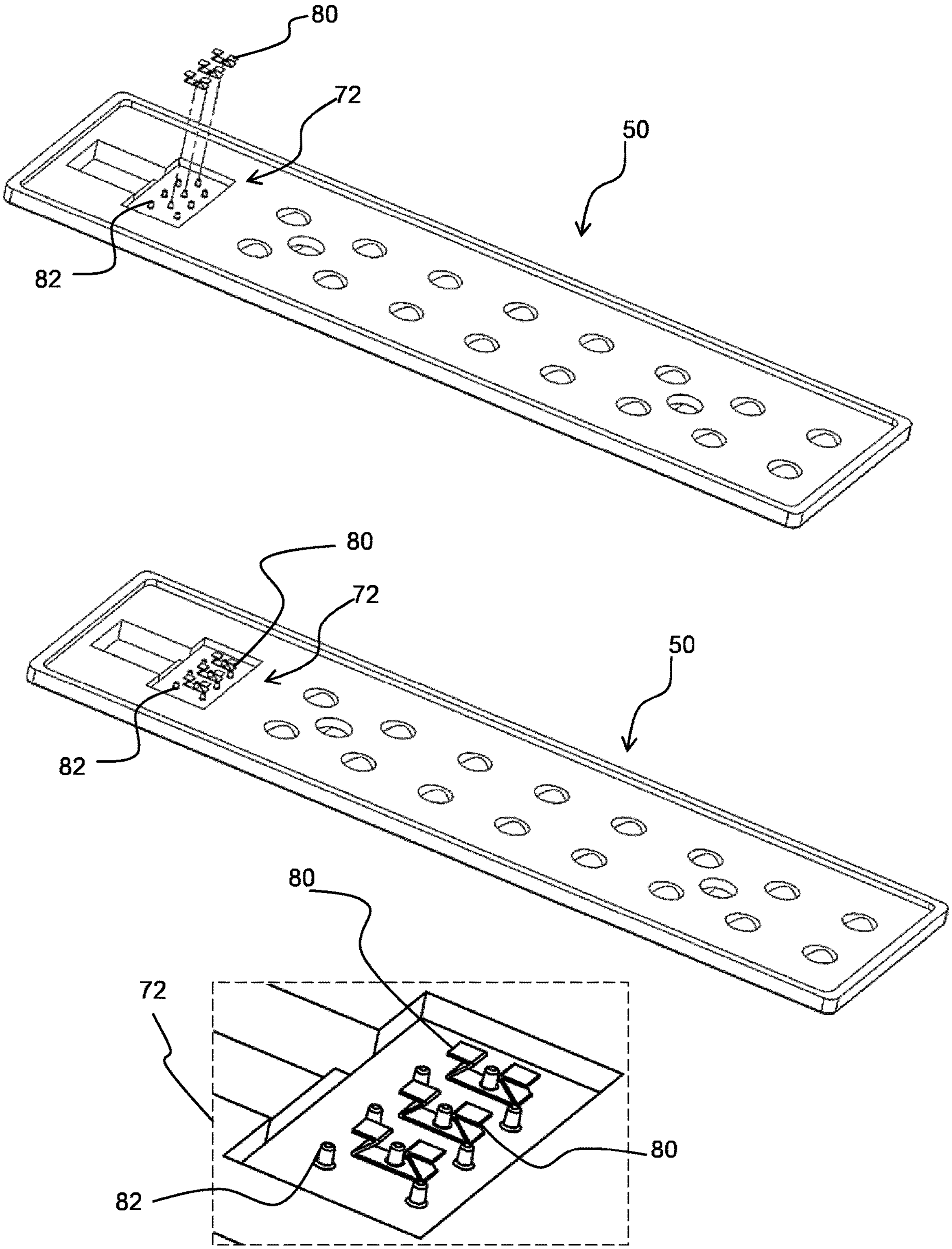
FIG. 8 shows the connectors in more detail and in particular for creating the first, series, configuration of FIG. 1.

FIG. 8 shows the underside of the lens plate to show the connectors in more detail and in particular for creating the first, series, configuration of FIG. 1. The top image shows the connectors before fitting to the underside of the lens plate and the middle image shows the fitted connectors, again viewed from the underside of the lens plate.

The bottom image shows an enlarged view of the mounting area 72 at which the pins 82 are provided, and the connectors 80 are mounted on a selected set of the pins.

There are three connectors 80 and in combination they implement the connections F1-F2, F3-F4 and F5-F6. As shown in FIG. 5, this requires three connections in the row direction.

Each of the three connectors 80 is mounted over a pin 82 which extends from the mounting area 72.

The lens plate is thus used to set the circuit configuration of the LED panel over which the lens plate is mounted, for example to choose between a high voltage mode and a low voltage mode. In this way, a single LED panel design is able to be used in two different circuit configurations. This reduces inventory and thereby reduces cost as well as providing flexibility for the customer. The configuration of the LED panel can simply be achieved by connectors of the lens plate.

Figure 9:
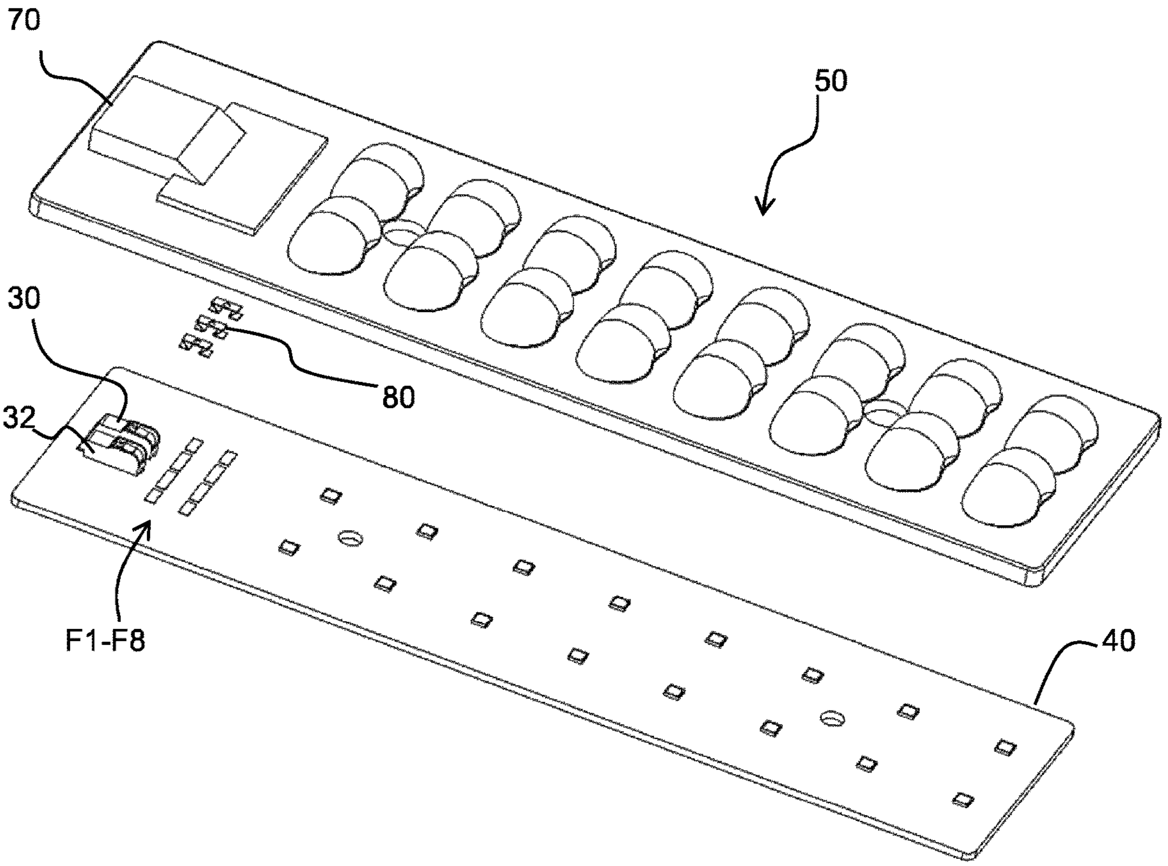
FIG. 9 shows an exploded view of the PCB, lens plate and connectors for this first circuit configuration.

FIG. 9 shows an exploded view of the PCB 40, lens plate 50 and connectors 80 for this first circuit configuration. The positive terminal 30 and negative terminal 32 form a terminal block within the terminal housing 70.

Figure 10:
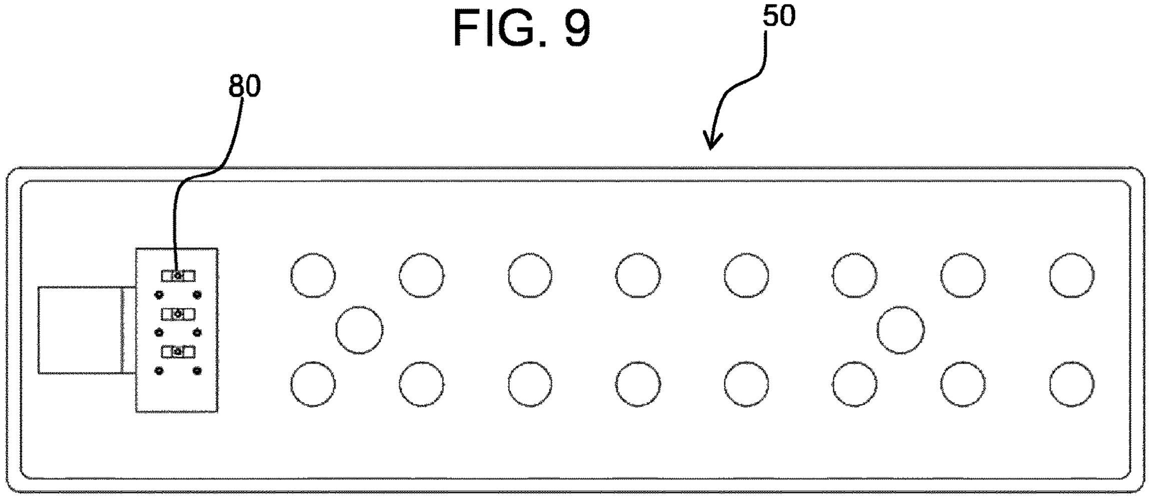
FIG. 10 shows a plan view which most clearly shows the row direction connections made by the connectors.

FIG. 10 shows a plan view which most clearly shows the row direction connections made by the connectors 80.

Figure 11:
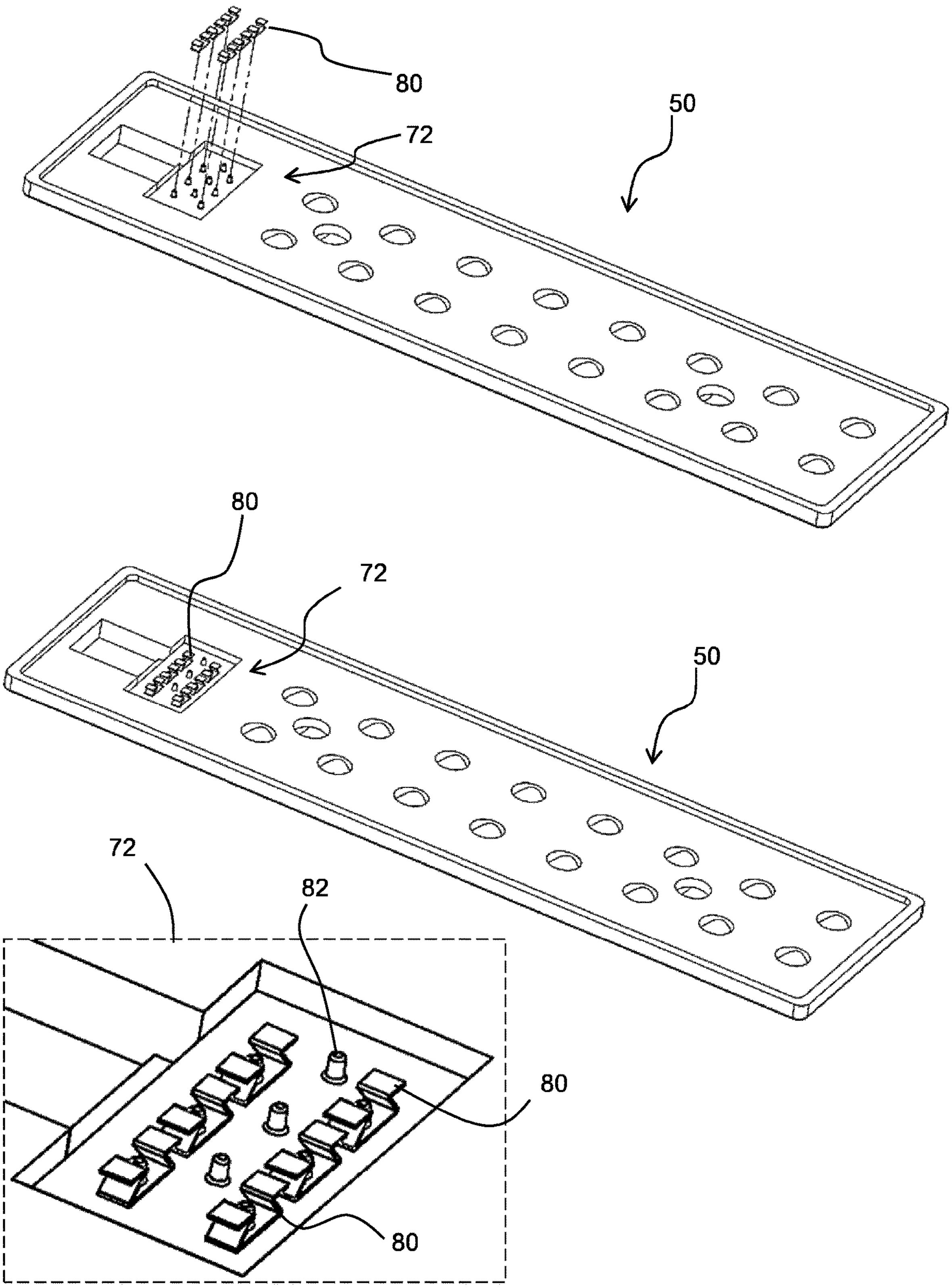
FIG. 11 shows the arrangement of connectors for creating the second, parallel, configuration of FIG. 2.

FIG. 11 shows the arrangement of connectors for creating the second, parallel, configuration of FIG. 2. The top image again shows the connectors 80 before fitting to the underside of the lens plate 50 and the middle image shows the fitted connectors.

The bottom image again shows an enlarged view of the mounting area 72 at which the pins 82 are provided, and the connectors 80 are mounted on a selected set of the pins.

There are six connectors 80 and in combination they implement the connections F1-F3, F3-F5, F5-F7, F2-F4, F4-F6 and F6-F8. As shown in FIG. 5, this requires six connections in the column direction.

Each of the six connectors 80 is again mounted over a pin 82.

Figure 12:
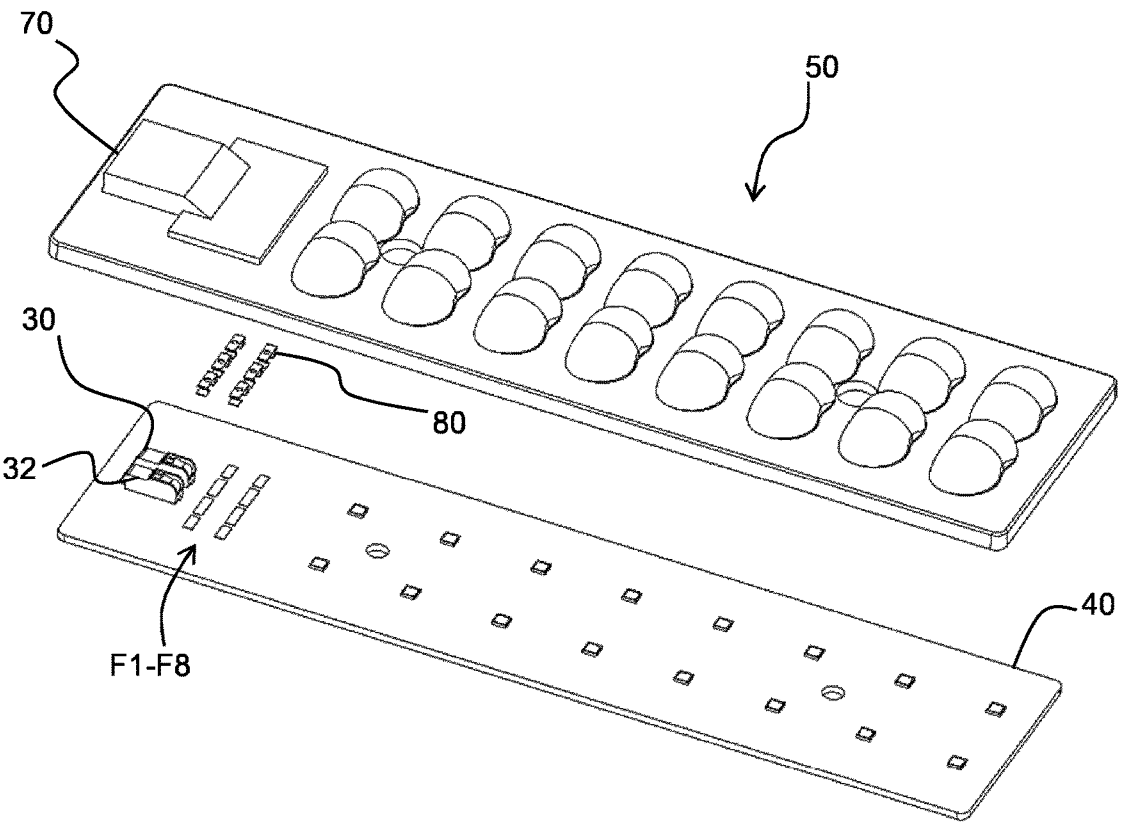
FIG. 12 shows an exploded view of the lens plate and connectors for this second circuit configuration.

FIG. 12 shows an exploded view of the PCB 40, lens plate 50 and connectors 80 for this second circuit configuration.

Figure 13:
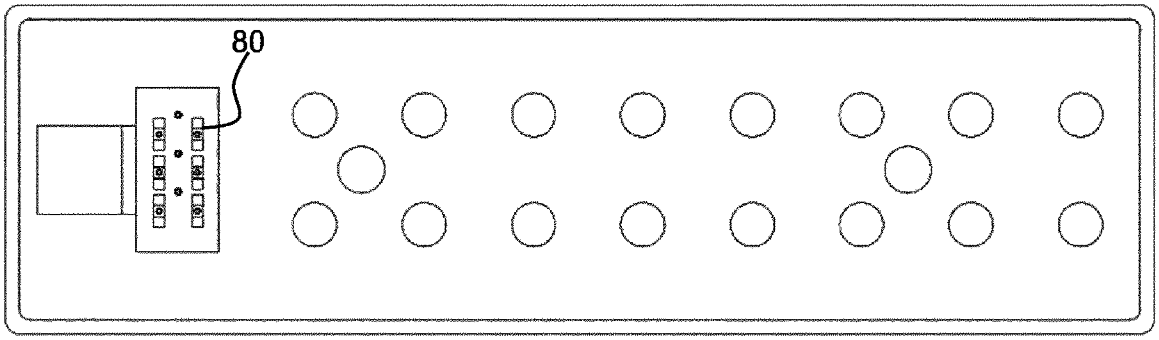
FIG. 13 shows a plan view which most clearly shows the column direction connections made by the connectors.

FIG. 13 shows a plan view which most clearly shows the column direction connections made by the connectors 80.

Each connector in the examples shown comprises a folded metal sheet for connecting together two adjacent connector pads of the LED panel. In the arrangement of FIGS. 11 to 13, some of the connector pads (F3, F5, F4 and F6) are contacted by two connectors. The folded metal sheets provide a spring contact force against the connector pads. This ensures good electrical contact to the connector pads.

Instead of individual connectors 80, the set of connectors may form a connector block. There may then be two connector blocks, one for each configuration. By ensuring the connector blocks can only be mounted in one position and orientation, it can be ensured that the correct pad connections are made.

The connectors and connector pads may instead be designed so that one connector block has two possible positions or orientations to implement the two possible circuit configurations.

There may be more than two circuit configurations. For example, the circuit of FIG. 3 could be configured as two parallel branches of 8 LEDs. This can be achieved by connecting F1-F2, F3-F7, F4-F8 and F5-F6. This would require different connector designs (since not all connector pads are adjacent to each other).

The circuit configurations described above relate to low and high voltage modes. They may instead relate to other circuit differences, for example different circuit configurations for different color channels, or for connecting different numbers of LED, e.g. for different brightness or power consumption.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A lighting device comprising:

a LED panel, comprising:

a LED carrier;

an arrangement of LEDs; and connector pads on the LED carrier, wherein a first set of interconnections between the connector pads configures the arrangement of LEDs into a first circuit configuration and a second set of interconnections between the connector pads configures the arrangement of LEDs into a second, different, circuit configuration; and a lens plate mounted over the LED panel, wherein the lens plate comprises:

a first, light exit, face, and an opposite second face;

an array of lenses;

a configurable set of connectors extending from the second face, wherein the set of connectors is for contacting the connector pads of the LED panel, thereby to configure the LED panel into a selected one of the first circuit configuration and the second circuit configuration;

wherein the first circuit configuration comprises more LEDs in a series than the second circuit configuration.

2. The lighting device of claim 1, wherein, the first circuit configuration is a first voltage circuit configuration and the second circuit configuration is a second voltage circuit configuration; wherein the first voltage is higher than the second voltage.

3. The lens plate of claim 1, wherein each connector comprises a folded metal sheet for connecting together two adjacent connector pads of the LED panel.

4. The lens plate of claim 3, the folded metal sheets are each adapted to provide a spring contact force against the connector pads.

5. The lens plate of claim 3, wherein the lens plate comprises a set of mounting pins, each of which is for mounting a connector.

6. The lighting device of claim 1, wherein the configurable set of connectors forms a connector block.

7. The lighting device of claim 1, wherein the LED carrier comprises a printed circuit board and the connector pads comprise bare copper pads of the printed circuit board.

8. The lighting device of claim 1, wherein the first circuit configuration comprises a series connection of all of the LEDs and the second circuit configuration comprises a connection of multiple parallel branches of LEDs.

9. The lighting device of claim 8, wherein the arrangement of LEDs comprises branches of LEDs, wherein each branch has an open circuit connector pad at least at one end.

10. The lighting device of claim 9, wherein the arrangement of LEDS comprises:

a positive terminal;

a negative terminal;

a first branch of series LEDs connected at one end to the positive terminal and connected to an open circuit connector pad at the other end;

a second branch of series LEDs connected at one end to the negative terminal and connected to an open circuit connector pad at the other end;

one or more additional branches of LEDs, each having an open circuit connector pad at both ends.

11. The lighting device of claim 1, wherein the connector pads are formed as a grid, wherein the configurable set of connectors is configurable to provide connections either in a first direction of the grid or in a second, orthogonal, direction of the grid.

12. The lighting device of claim 11, wherein when in the second circuit configuration the LED panel has a drive voltage in the range 24V to 48V.

13. The lighting device of claim 1, wherein when in the first circuit configuration the LED panel has a LED drive voltage of over 100V and when in the second circuit configuration the LED panel has a LED drive voltage of below 100V.

* * * * *